(12) United States Patent
Pusdesris et al.

(10) Patent No.: US 11,204,878 B1
(45) Date of Patent: Dec. 21, 2021

(54) WRITEBACKS OF PREFETCHED DATA

(71) Applicant: Arm Limited, Cambridge (GB)

(72) Inventors: Joseph Michael Pusdesris, Austin, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/065,834

(22) Filed: Oct. 8, 2020

(51) Int. Cl.
*G06F 12/0897* (2016.01)
*G06F 12/0862* (2016.01)
*G06F 9/30* (2018.01)
*G06F 12/02* (2006.01)
*G06F 12/0811* (2016.01)

(52) U.S. Cl.
CPC ...... *G06F 12/0897* (2013.01); *G06F 9/30047* (2013.01); *G06F 12/0238* (2013.01); *G06F 12/0811* (2013.01); *G06F 12/0862* (2013.01)

(58) Field of Classification Search
CPC .................................................. G06F 12/0897
USPC ........................................................ 711/154
See application file for complete search history.

(56) References Cited

U.S. PATENT DOCUMENTS

2003/0084252 A1* 5/2003 Talagala ............. G06F 12/0866
711/135
2004/0230746 A1* 11/2004 Olds .................... G06F 12/0804
711/133

* cited by examiner

*Primary Examiner* — Jae U Yu
(74) *Attorney, Agent, or Firm* — Nixon & Vanderhye P.C.

(57) ABSTRACT

An apparatus is provided that includes a memory hierarchy comprising a plurality of caches and a memory. Prefetch circuitry acquires data from the memory hierarchy before the data is explicitly requested by processing circuitry configured to execute a stream of instructions. Writeback circuitry causes the data to be written back from a higher level cache of the memory hierarchy to a lower level cache of the memory hierarchy and tracking circuitry tracks a proportion of entries that are stored in the lower level cache of the memory hierarchy having been written back from the higher level cache of the memory hierarchy, that are subsequently explicitly requested by the processing circuitry in response to one of the instructions.

16 Claims, 5 Drawing Sheets

WRITEBACKS OF PREFETCHED DATA

TECHNICAL FIELD

The present disclosure relates to memory systems.

DESCRIPTION

In a memory system, data is sometimes prefetched. Prefetching is the proactive fetching of data into the cache in anticipation that the data will be required in the future. When that data is later explicitly requested, it is already available and need not be fetched from lower levels of the memory hierarchy (e.g. from the memory or a Last Level Cache). The effective memory latency is thus reduced. A question arises when that data is to be evicted from the cache if the data has not been explicitly requested. In particular, the data could be written back to a lower level cache, or completely evicted so that it must be re-retrieved from the memory if it is later requested. Writing the data back could result in storing data that will go unused (e.g. if the data has been erroneously prefetched). On the other hand, evicting the data could result in higher memory latency if the data is subsequently requested (e.g. if the data has been prefetched too early). Further complicating this problem is the fact that a prefetcher might contain a number of prefetch engines, each of which could be prone to either or both of prefetching early and misprediction.

SUMMARY

Viewed from a first example configuration, there is provided an apparatus comprising: a memory hierarchy comprising a plurality of caches and a memory; prefetch circuitry to acquire data from the memory hierarchy before the data is explicitly requested by processing circuitry configured to execute a stream of instructions; writeback circuitry to cause the data to be written back from a higher level cache of the memory hierarchy to a lower level cache of the memory hierarchy; and tracking circuitry to track a proportion of entries that are stored in the lower level cache of the memory hierarchy having been written back from the higher level cache of the memory hierarchy, that are subsequently explicitly requested by the processing circuitry in response to one of the instructions.

Viewed from a second example configuration, there is provided a method comprising: prefetching data from the a memory hierarchy, comprising a memory and a plurality of caches, before the data is explicitly requested by processing circuitry configured to execute a stream of instructions; causing the data to be written back from a higher level cache of the memory hierarchy to a lower level cache of the memory hierarchy; and tracking a proportion of entries that are stored in the lower level cache of the memory hierarchy having been written back from the higher level cache of the memory hierarchy, that are subsequently explicitly requested by the processing circuitry in response to one of the instructions.

Viewed from a third example configuration, there is provided an apparatus comprising: means for prefetching data from the a memory hierarchy, comprising a memory and a plurality of caches, before the data is explicitly requested by processing circuitry configured to execute a stream of instructions; means for causing the data to be written back from a higher level cache of the memory hierarchy to a lower level cache of the memory hierarchy; and means for tracking a proportion of entries that are stored in the lower level cache of the memory hierarchy having been written back from the higher level cache of the memory hierarchy, that are subsequently explicitly requested by the processing circuitry in response to one of the instructions.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: a memory hierarchy comprising a plurality of caches and a memory; prefetch circuitry to acquire data from the memory hierarchy before the data is explicitly requested by processing circuitry configured to execute a stream of instructions; writeback circuitry to cause the data to be written back from a higher level cache of the memory hierarchy to a lower level cache of the memory hierarchy; and tracking circuitry to track a proportion of entries that are stored in the lower level cache of the memory hierarchy having been written back from the higher level cache of the memory hierarchy, that are subsequently explicitly requested by the processing circuitry in response to one of the instructions.

The above configuration performs prefetching by obtaining data from a lower level of the hierarchy (e.g. towards the memory) and storing it at a higher level of the hierarchy (e.g. towards the processor) before the data is explicitly requested by an instruction being executed by the processor. When the (e.g. unrequested) data is considered for eviction and subsequently written back (e.g. to a cache that is closer to the memory than the location where the data was prefetched to), tracking circuitry determines whether the data is subsequently requested or not. In other words, the tracking circuitry is able to determine the proportion of data items that are written back and then subsequently explicitly requested. These data items are data items that would have to have been re-fetched from memory if they had been completely evicted from the caches. This information can then be used to inform future decisions regarding whether unused prefetched data should be written back or completely evicted.

In some examples, the writeback circuitry is configured to cause the data to be written back from the higher level cache of the memory hierarchy to the lower level cache of the memory hierarchy when the data is to be evicted from the higher level cache, when at least one of one or more conditions is met. The decision as to whether data is to be written back to the lower level cache from the higher level cache when eviction from the higher level cache occurs (as opposed to simply evicting it) is therefore dependent on one of the one or more conditions occurring. This provides a situation in which the writeback process for the data is conditional and may be affected by one or more factors rather than always writing the data back or always discarding.

In some examples, the writeback circuitry is configured to inhibit the data from being written back from the higher level of the cache of the memory hierarchy to the lower level cache of the memory hierarchy when the data is to be evicted from the higher level cache, when each of the one or more conditions is other than met. In situations in which the conditions are not met, then the data is evicted from the higher level cache without being written back. Consequently, during an eviction, the data is effectively deleted from the caches of the memory hierarchy and is retained in the memory of the memory hierarchy so that that data can be reacquired by the cache if necessary. This is as opposed to keeping the data in the cache by evicting it from one level of the cache and writing it back to another level of the cache.

In some examples, the one or more conditions comprise a first condition that the proportion of entries stored in the lower level cache of the memory hierarchy having been prefetched and written back from the higher level cache of the memory hierarchy unused, that are subsequently explicitly requested by the processing circuitry is at least a predetermined proportion. The proportion therefore reflects the portion of entries that would have to have been reacquired from memory had those entries been evicted without the writeback occurring. For instance, a proportion of 0.3 would suggest that 30% of unused prefetched entries that are evicted from the higher level cache are subsequently explicitly requested. If those entries are fully evicted from the caches then those entries would have to be reacquired from memory. The remaining 70% of entries are not re-requested and can thus be considered to be the result of mispredictions (e.g. prefetched in error). If such entries are written back to a lower level of the hierarchy, they can be considered to be using cache space unnecessarily. By considering this proportion as one of the conditions on which other data is evicted or written back to the lower level cache, it is possible to consider whether the system would have been better off by completely evicting previous entries or by holding onto them in the lower level cache to avoid reacquiring the data from the memory system (which is generally considered to be significantly slower than the lower level cache). This allows an intelligent and informed decision to be made regarding where the future evicted data should be written back or not.

In some examples, the predetermined proportion is 0.25. Such examples therefore consider that when 25% or more of prefetched unused entries are written back to the lower level cache and subsequently requested from the lower level cache, it is worthwhile keeping data by writing it back to the lower level cache than completely evicting it from the caches of the memory hierarchy. Below 25%, a greater value may be had by simply evicting the data from the caches of the memory hierarchy, which provides more cache storage for other data.

In some examples, the predetermined proportion is calculated over a predetermined number of previous writebacks performed by the writeback circuitry. In these examples, the writeback circuitry considers the behaviour of the system over a number of previous writebacks that have been performed. For example, the writeback circuitry may define a number of windows. If, during the previous window, the predetermined proportion was reached, then data is written back to the lower level cache. If the predetermined proportion was not reached during the previous window, then the data is not written back (unless another writeback condition is met). Any writebacks that do occur (e.g. if another writeback condition is met) affect the current window. When the current window has completed, as a result of a predetermined number of writebacks occurring, the current window becomes the new previous window, and the writeback policy might change. This makes it possible for the writeback circuitry to adapt over time to changes in circumstance. For instance, if for a period of time, becomes advantageous for data to be written back, then the system is able to respond to this by writing data back to the lower level cache. If, in due course, the system would benefit from data not being written back, then the system is able to adapt to this and is able to cause data to be evicted from the caches of the memory hierarchy rather than being written back to a lower level cache.

In some examples, the predetermined number is 64. There are, of course, a number of different examples of what the predetermined number could be. Typically, the predetermined number is a power of two (or one less than a power of two) so that a counter can be efficiently implemented. However, it has been determined that a value of 64 for the predetermined number is small enough that the system can adapt to changes in circumstances while being large enough to consider the situation over a number of accesses in order to average out any extreme behaviour.

In some examples, the one or more conditions comprise a second condition that the data is stored at a memory address in a subset of the memory that is associated with the prefetch circuitry. For data at certain memory addresses (e.g. those within a predetermined subset of the address space—either virtual or physical) writeback occurs regardless of other conditions. This makes it possible for analysis to be performed. In particular, the subset of the address space or the memory can be used in order to establish a sample in order to control the behaviour of the rest of the memory space. In alternative embodiments in which writeback can be completely disabled, it becomes very difficult if not possible to determine whether the system would have benefited from data having been written back or not. This is because, with writeback not occurring, there might be no way to track whether evicted data is subsequently requested or not.

In some examples, the prefetch circuitry comprises a plurality of prefetchers, each of which performs prefetching based on different criteria; and the tracking circuitry is configured to track, for each prefetcher in the prefetchers, the proportion of the entries that are prefetched by that prefetcher and stored in the lower level cache of the memory hierarchy having been written back from the higher level cache of the memory hierarchy, that are subsequently explicitly requested by the processing circuitry in response to one of the instructions. The prefetch circuitry may make use of a number of prefetchers, with each of the prefetchers having its own algorithms and/or parameters that are used to determine where the data should be prefetched or not. In these examples, the tracking that is performed by the tracking circuitry is performed on a prefetcher-by-prefetcher basis. In other words, the proportion of entries that are prefetched by a given prefetcher and stored in the lower level cache of the memory hierarchy after having been written back from the higher level cache of the memory hierarchy and are subsequently explicitly requested is tracked. This makes it possible to determine, for each of the prefetchers, whether that prefetcher is prefetching data too early (causing it to be written back to the lower level cache of the hierarchy without being used), or whether that prefetcher is incorrectly prefetching data (by fetching data that is never used, written to the lower level of the memory hierarchy and still never used). It is therefore possible to control the behaviour of data that is prefetched and not used in dependence upon the prefetcher that prefetched the data.

In some examples, each of the prefetchers is associated with a different subset of the memory; and the proportion is tracked for each prefetcher based on those of the entries that are prefetched by that prefetcher whose memory address lies within the subset of the memory associated with that prefetcher. In this way, each prefetcher is able to perform its own sampling and thereby make an independent decision as to whether unused data prefetched by that prefetcher should be written back at eviction time or not.

In some examples, the writeback circuitry is configured to inhibit writing back the data when the data was prefetched by a first prefetcher and has a memory address within the subset of the memory associated with a different prefetcher. In this way, the prefetchers do not interfere with each other's sampling spaces and so data that is prefetched by one prefetcher but lies within the sampling space of another prefetcher is automatically not written back. In particular, since the prefetcher that was responsible for prefetching data is not tracked, prefetchers do not write back data whose address falls within another prefetcher's associated address space.

In some examples, the prefetch circuitry is configured to acquire the data from the memory hierarchy; and the prefetch circuitry is configured to cause the data to be stored in the higher level cache. There are a number of locations from which the data can be acquired. For instance, the data could be acquired from the memory in the memory hierarchy. In other examples, the data could be acquired from a lower level cache (e.g. towards the memory). In these examples, the prefetched data is stored in the higher level cache. That is, data is not prefetched into the lowest level cache of the system, but is instead prefetched into a higher level cache with a lower level cache being available for the data to be written back to when the data is evicted from the higher level cache.

In some examples, the higher level cache is a second-last-level cache. A second-last-level cache can be considered to be a cache that is not adjacent to the memory in the memory hierarchy, but is directly adjacent to a last-level-cache, which is adjacent to the memory in the memory hierarchy. Phrased differently, the higher level cached can be considered to a cache where there is a lower level of cache before the memory hierarchy.

In some examples, the lower level cache is a last-level cache. A last-level-cache can be considered to be the final cache in the memory hierarchy before the memory itself. Typically, the last-level-cache is the largest and slowest cache in the memory hierarchy, which nevertheless is generally faster than the memory itself.

Particular embodiments will now be described with reference to the figures.

Figure 1:
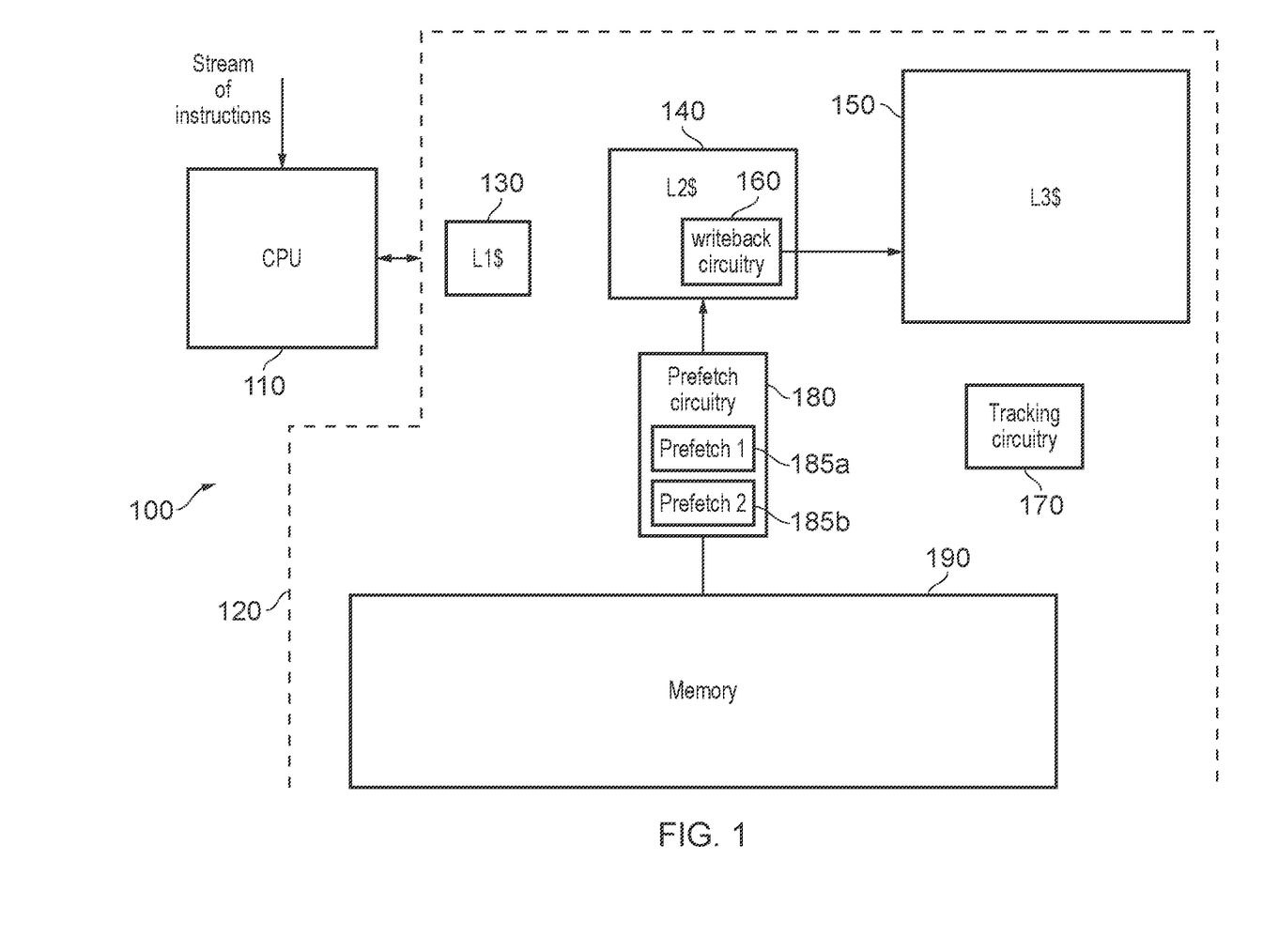
FIG. 1 schematically illustrates a system in which a CPU executing a stream of instructions communicates with a memory hierarchy in accordance with some embodiments.

FIG. 1 illustrates a system 100 in which a CPU 110 executing a stream of instructions communicates with a memory hierarchy 120. The memory hierarchy 120 comprises a level one cache 130, a level two cache 140, a level three cache 150, and a memory 190. The memory could, for instance, take the form of a DRAM. Prefetch circuitry 180 is also provided in order to proactively acquire data from the memory hierarchy 120 and store it in one of the caches 130, 140, 150 before it is explicitly requested for the execution of one of the instructions being executed by the CPU 110. In this example, the prefetch circuitry 180 acquires data from the memory 190 and stores it in the level two cache 140 although data could be prefetched from other locations in the memory hierarchy and also stored in other locations in the memory hierarchy (typically to a part of the memory hierarchy that is closer to the processor from where it was acquired).

Note that in this example, the prefetch circuitry 180 forms part of the memory hierarchy 120. However, in other embodiments, the prefetch circuitry 180 may fall outside the realm of the memory hierarchy 120.

As a result of prefetching, the time taken to obtain the data from the memory 190 can be reduced, thereby reducing the effective memory latency. The prefetch circuitry 180 contains one or more prefetch circuits 185a, 185b, each of which implements a prefetch engine. Each of the prefetch engines uses a different prediction algorithm to determine data that is predicted to be required by a future instruction executed by the CPU 110. The efficacy of each of the engines is therefore likely to differ. Some engines may find themselves more efficient in some circumstances than other circumstances. Efficacy might also change over time.

There are two particular relevant scenarios that can occur with respect to prefetching. One of these is that the prefetch circuitry prefetches data that is not subsequently required by the CPU 110. This situation is referred to as misprediction. Misprediction is undesirable, as although prefetching often takes place when the memory hierarchy 120 is otherwise unengaged, it can cause data to be evicted from the caches 130, 140, 150 to make way for data that is not actually required. This can cause accesses made to the evicted data to be slowed down. The second relevant scenario that can occur is that the prefetch circuitry 180 is too eager. In particular, the prefetch circuitry 180 might acquire data long before it is actually required. In this situation, due to the limited capacity of each of the caches, it may be the case that the prefetched data is evicted from the cache before being used. For instance, in this scenario, the prefetched data might be stored in the level two cache 140 and evicted before it is actually used.

A dilemma therefore exists. In particular, it is not known for certain whether prefetched data will actually be used or not. When eviction of the data is to occur, it is therefore unclear as to whether the prefetched data should simply be evicted from the caches 130, 140, 150 of the memory hierarchy 120 altogether, or whether the data should be evicted from a higher level cache and written back to a lower level cache (in this case the level three cache 150) in anticipation that the data will be required in the future.

The present technique makes use of tracking circuitry 170. The tracking circuitry 170 determines a proportion of unused data that is written back by writeback circuitry 160 from the level two cache 140 to the level three cache 150 that is subsequently explicitly requested by the CPU 110. In this way, the tracking circuitry 170 is able to determine the proportion of unused prefetched data that is evicted from a cache (e.g. the level two cache 140), written back to a lower level cache (e.g. the level three cache 150) and then explicitly requested. This represents the proportion of unused prefetched data that would have been re-obtained from memory had the data been fully evicted from the cache. Such re-obtaining is wasteful because it represents a situation in which two accesses are made to obtain a single item of data, which is subsequently used.

In this example, the tracking circuitry 170 is shown as being a distinct component. However, the tracking circuitry could alternatively form all or part of the level three cache 150 or the prefetch circuitry 180.

Figure 2:
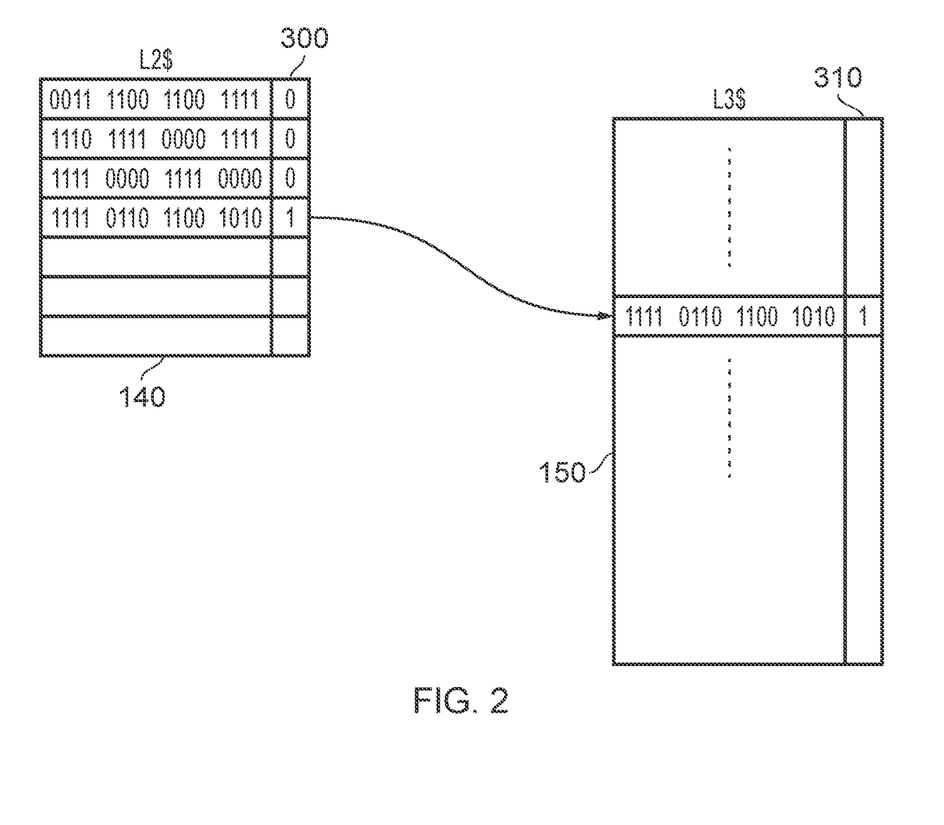
FIG. 2 illustrates the acquisition of data for use by the tracking circuitry.

FIG. 2 illustrates a method in which data can be acquired for use by the tracking circuitry 170. In particular, FIG. 2 illustrates the writeback of a cache line '1111 0110 1100 1010' from the level two cache 140 to the level three cache 150. In this example, within the level two cache 140, a single bit 300 is used to indicate whether the data was prefetched and unused. In this example, a '1' indicates that the data has been prefetched and not yet used. A value of '0' refers to data that was either not prefetched or was prefetched and has been used. A similar bit field 310 is used in the level three cache 150 where the data is written back to when it is evicted from the level two cache 140 and the value of the bit field 300 for a given data item in the level two cache 140 is copied to the bit field 310 in the level three cache when the data item is written back from the level two cache 140 to the level three cache 150.

Figure 3:
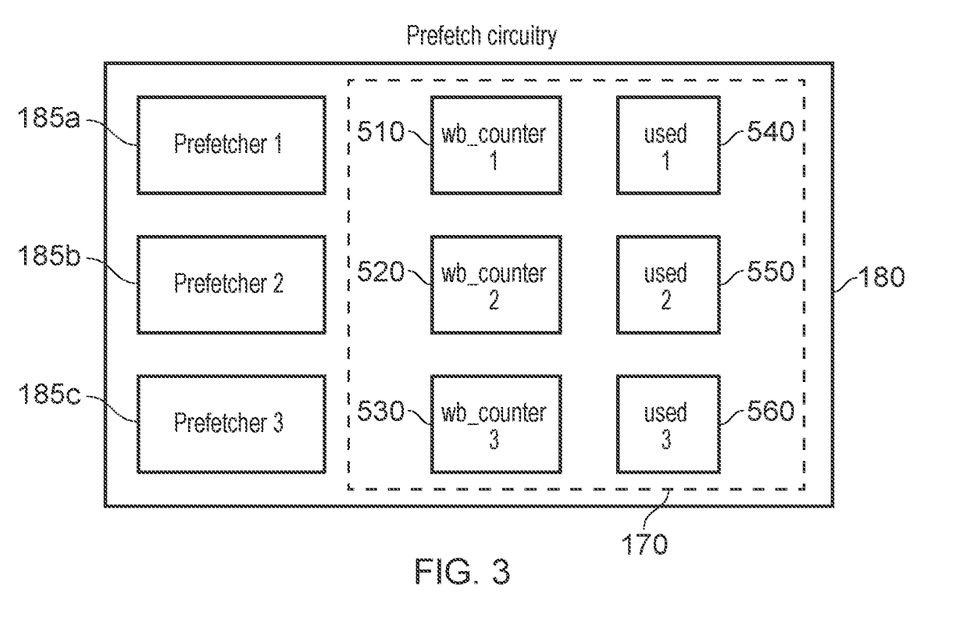
FIG. 3 illustrates the tracking circuitry in more detail.

FIG. 3 illustrates the tracking circuitry 170 in more detail, which in this example forms part of the prefetch circuitry 180, together with three prefetchers (prefetch engines) 185a, 185b, 185c. In particular, in respect of each of the prefetchers 185a, 185b, 185c, a pair of counters is provided. For instance, in respect of the first prefetcher 185a, a first counter wb_counter 510 is provided that counts, for data acquired by the first prefetcher 185a, a number of data items that were prefetched, unused, and written back to the level three cache 150. Additionally, a first counter used 540 is provided in respect of the first prefetcher 185a that counts a number of those data items that were subsequently explicitly requested by the CPU 110.

Similarly, a second wb_counter 520 and a second used counter 550 are provided in respect of data prefetched by the second prefetcher 185b. Also, a third wb_counter 530 and a third used counter 560 are provided in respect of data that is prefetched by the third prefetcher 185c.

In this way, it is possible to analyse the performance of each of the three prefetchers 185a, 185b, 185c in terms of the proportion of unused prefetched data that is written back to the third level cache 150, and subsequently explicitly requested by the CPU 110. In other words, this provides, for each prefetcher, a measure of whether that prefetcher is mispredicting (when a large proportion of the written back data is not later explicitly requested) or being too eager (when a large proportion of the written back data is later explicitly requested). This information can then be used to inform the future behaviour of each of the prefetchers 185a, 185b, 185c. For example, mispredicted data is unlikely to serve any purpose and so might be evicted without being written back to a lower level cache whereas early predicted data might be written back in the hope that it will be used.

There are a number of ways in which this information can be counted. However, one method involves sampling. In particular, for each prefetcher, some of the unused, data prefetched by that prefetcher is always written back to the lower level cache so that it can be observed whether the data is subsequently explicitly requested or not.

Figure 4:
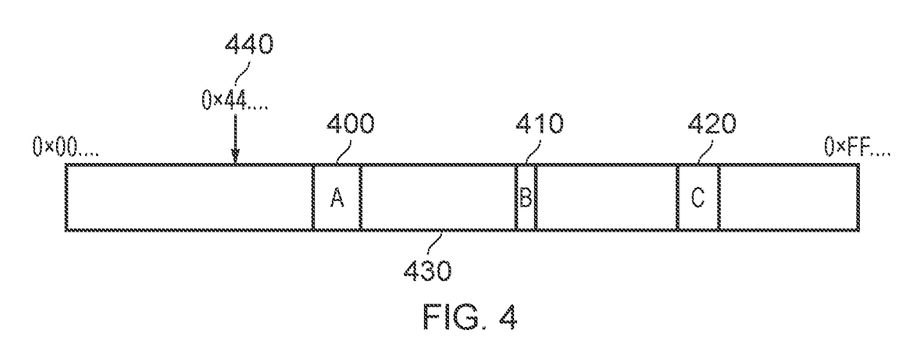
FIG. 4 illustrates an example based on use of an address space.

FIG. 4 illustrates an example of an address space 430, which could be a physical address space of the memory 190, or could be a virtual address space of the memory hierarchy 120. Within this address space 400, a number of sub-regions 400, 410, 420 are defined. In the present technique, each of the sub-regions 400, 410, 420 is allocated to one of the prefetchers 185a, 185b, 185c. For instance the second prefetcher 185b might be associated with sub-region A 400. When unused data whose address is within sub-region A 400 is prefetched by the second prefetcher 185b, it will be written back to the level three cache 150. Additionally, the counters 520, 550 associated with the second prefetcher 185b only count data prefetched by the second prefetcher 185b whose address falls within the associated sub-region A 400. The sub-region A 400 therefore acts as a 'sampling space' where the behaviour of the associated prefetcher 185b (in terms of misprediction versus over-eager prediction) can be assessed.

Similarly, a second sub-region 410 of the address space 430 can be allocated to the first prefetcher 185a whose associated counters 510, 540 might only count data prefetched by the first prefetcher 185a whose address falls within the associated sub-region 410. A third sub-region 420 can be allocated to the third prefetcher 185c whose associated counters 530, 560 might only count data prefetched by the third prefetcher 185c whose address falls within its associated sub-region 420. In some examples, if a prefetcher prefetches data belonging to the sub-region associated with another prefetcher (e.g. if the first prefetcher 185a prefetches data at an address in sub-region C 420) then the data is automatically not written back to the level three cache 150 on eviction. Thus, each prefetcher is given its own sampling space with which it can be determined whether the prefetcher has a predilection for mispredicting or for being over-eager.

For an address 440 falling outsider any of these regions 400, 410, 420, the decision of whether to write back the data to the level three cache 150 using the writeback circuitry 160 is dependent on the values of the counters 510, 540, 520, 550, 530, 560. In particular, the counters associated with the prefetcher the prefetched the data are considered. Note that the counters are not considered for data falling within one of the sub-regions 400, 410, 420. This means that the counters can continue to collect data and decisions about default behaviour for evicted data can change over time.

There are a number of ways in which the counters can be used to make a decision. For example, an example condition of where unused data prefetched by a given prefetcher 185a, that falls outside the associated sub-region 410 is written back by the writeback circuitry 160 is where the value of the counter used 540 divided by the counter wb_counter 510 is greater than or equal to 0.25. This represents the situation in which the sampling carried out for the first prefetcher 185a in the sub-region B 410 indicates that enough data prefetched by the first prefetcher 185a is subsequently explicitly requested that it is generally worth writing data back to the third level cache 150 rather than completely evicting it from the memory hierarchy 120 altogether. The sampling performed by other prefetchers in their sub-regions 400, 420 might suggest a different behaviour in respect of data that is prefetched by those prefetchers and lies outside the sub-regions 400, 420.

Note that not all of the sub-regions 400, 410, 420 need to be identically sized. Furthermore, the proportions that are used may be different for some prefetchers than for other prefetchers. Other metrics other than proportions may also be used. For instance, in some examples when the counter count 560 reaches a particular value, irrespective of the value of wb_counter 530, data is written back to the level three cache 150 when being evicted from the level two cache 140. Other techniques may also be employed.

The situation may be regularly reassessed. In particular, once the wb_counter 510, 520, 530 reaches a particular value (e.g. 64), a decision for future evictions may be decided. This decision may hold until the wb_counter 510, 520, 530 again reaches its saturation point of 64. This technique thereby defines a number of 'windows' in which the current writeback-eviction policy is dependent on the sampling carried out during an (immediately) previous window. Meanwhile, the behaviour of the prefetcher in respect of data in the prefetcher's associated sub-region is used to affect the current window.

Figure 5:
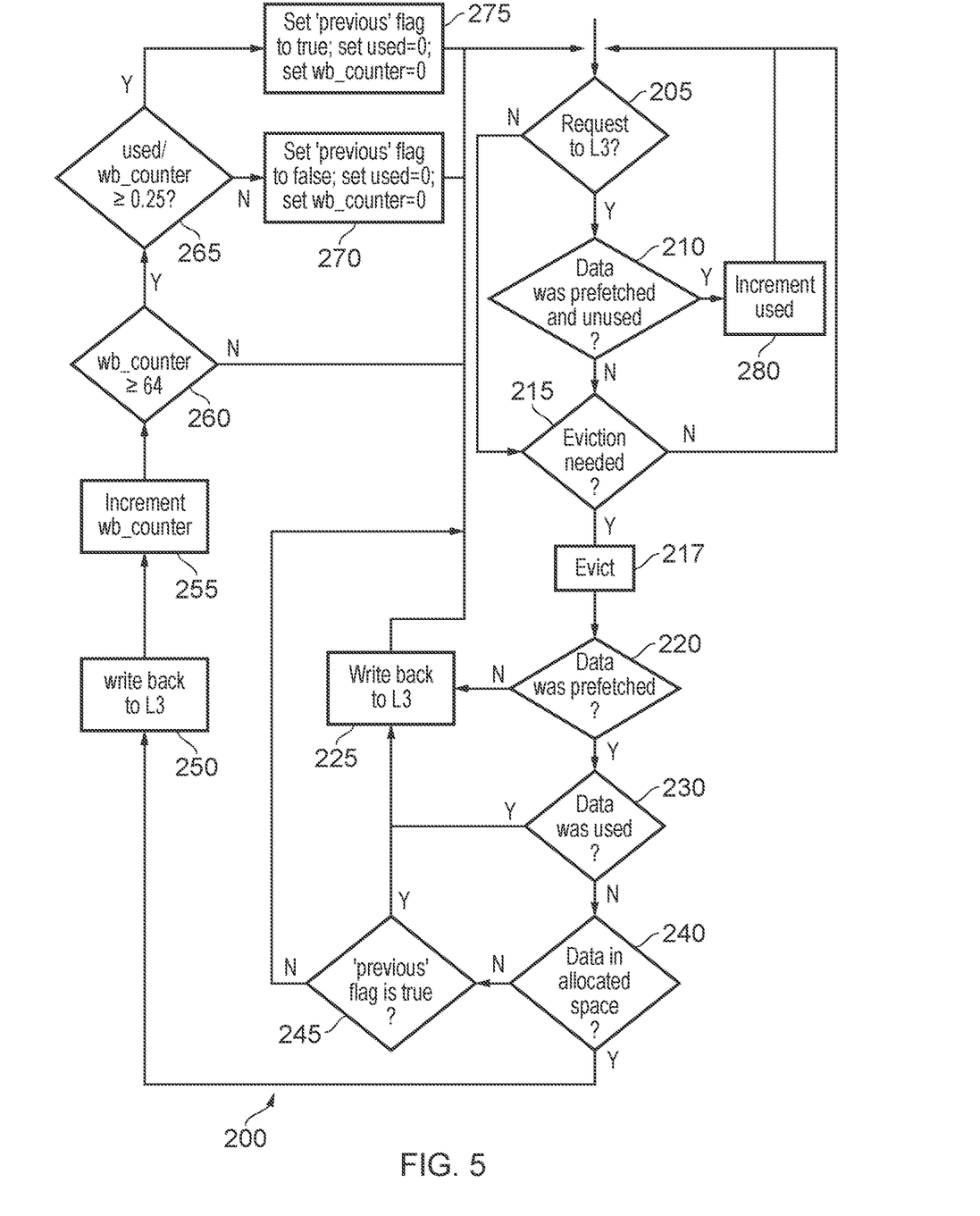
FIG. 5 illustrates a flow chart that shows a method of data processing in accordance with some embodiments.

FIG. 5 illustrates a flow chart 200 that shows the windowing process in more detail. The example shown in FIG. 5 assumes only a single prefetcher 185a is present. The process begins at step 205 where it is determined whether a request is being made to the level three cache 150. If so, then the process proceeds to step 210, where it is determined whether the data that is being accessed is prefetched and unused. If so, then at step 280, the used counter 540 of the prefetcher 185a that prefetched the data is incremented and the process returns to step 205. If the data was not prefetched and unused, or if a request to the level three cache 150 is not being made, then at step 215 it is determined whether an eviction in the level two cache 140 is needed. If not, then the process returns to step 205. Otherwise, at step 217, eviction is performed. Then at step 220, it is determined whether evicted data was prefetched. If not, then at step 225, the data is written back to the level three cache 150. Non-prefetched data is not relevant to the present disclosure and in this example is merely written back to the level three cache 150 (in other embodiments, the data could simply be evicted with no writeback). The process then returns to step 205.

If the data was prefetched at step 220 then step 230 determines whether the evicted data was used. If so, then the process proceeds to step 225 where the data is again written back to the level three cache 150 before proceeding to step 205. This represents the situation in which the data was correctly prefetched, in which case the data is simply treated the same as for non-prefetched data. If, at step 230, it is determined that the data was not used, then at step 240 it is determined whether the data's address falls within the allocated sub-region 410 for the prefetcher 185a that prefetched the data. If not, then at step 245 it is determined whether the 'previous' flag is true. The 'previous' flag indicates the current policy (based on a previous window) for the prefetcher 185a as to whether data falling outside the assigned address space 410 should be written back or not. If the answer is no, then the process simply returns to step 205 with the data having been evicted. Note that where multiple prefetchers are in use, step 245 also asks whether the data belongs to the assigned space 400, 420 of another prefetcher 185b, 185c. That is, if the 'previous' flag is true and if the data does not belong to the assigned space 400, 420 of another prefetcher 185b, 185c then the writeback occurs at step 225 otherwise the process returns straight to step 205.

If, at step 240, the data falls within the allocated space, then sampling occurs. The process proceeds to step 250 where the data is written back to the level three cache 150. In other words, data that is in the allocated space 410 for the prefetcher 185a is written back to the level three cache 150 regardless of the 'previous' flag. At step 255, the wb_counter counter 510 is incremented for the relevant prefetcher 185a. This counter 510 therefore counts the number of unused, prefetched data falling within the allocated space 410 for a given prefetcher 185a that is written back. Step 260 determines whether the wb_counter 510 for the prefetcher 185a is greater to or equal to 64 (64 being the sampling size). If not, the current sampling is not yet complete and the process simply returns to step 205. If so, then step 265 determines whether the proportion (the counter used 540 divided by the counter wb_counter 510 for the prefetcher 185a) is greater than or equal to 0.25 (the proportion required to cause writebacks to the level three cache 150 for data outside the allocated region 410). If not, then the sampling indicates that general writebacks to the level three cache 150 may not be beneficial and so the 'previous' flag is set to false at step 270. In addition, the counter used 540 and the wb_counter 510 for the relevant prefetcher 185a are reset and process returns to step 205. If the proportion (0.25 in this example) is reached then at step 275, the 'previous' flag is set to true. In addition, the counter used 540 and the wb_counter 510 for the prefetcher 185a are also both reset and the process returns to step 205.

Accordingly, the above description indicates how it is possible to track for a given sample, the proportion of writebacks that subsequently result in data being used in an explicit request. When the proportion of such requests in the sample that have benefited from being written back to the level three cache 150 reaches a particular value (e.g. 25%), then a general writeback policy is issued for data prefetched by that prefetcher. This way, the tracking circuitry 170 is able to take a sample of data to determine whether writebacks are generally efficient or not. Where the writebacks are efficient, writebacks are caused to occur for other data prefetched by that prefetcher.

Such determinations can be made for each of several prefetchers 185a, 185b, 185c within a system so that prefetchers that merely prefetch data early are more likely to have their data written back to a lower level cache on eviction, while prefetchers that erroneously prefetch data are more likely to simply have their data evicted. In this way, the level three cache 150 can be used to store data that has merely been obtained early rather than obtained erroneously.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
a memory hierarchy comprising a plurality of caches and a memory;
prefetch circuitry to acquire data from the memory hierarchy before the data is explicitly requested by processing circuitry configured to execute a stream of instructions;
writeback circuitry to cause the data to be written back from a higher level cache of the memory hierarchy to a lower level cache of the memory hierarchy; and
tracking circuitry to track a proportion of entries that are stored in the lower level cache of the memory hierarchy having been written back from the higher level cache of the memory hierarchy, that are subsequently explicitly requested by the processing circuitry in response to one of the instructions.

2. The apparatus according to claim 1, wherein
the writeback circuitry is configured to cause the data to be written back from the higher level cache of the memory hierarchy to the lower level cache of the memory hierarchy when the data is to be evicted from the higher level cache, when at least one of one or more conditions is met.

3. The apparatus according to claim 2, wherein
the writeback circuitry is configured to inhibit the data from being written back from the higher level of the cache of the memory hierarchy to the lower level cache of the memory hierarchy when the data is to be evicted from the higher level cache, when each of the one or more conditions is other than met.

4. The apparatus according to claim 2, wherein
the one or more conditions comprise a first condition that the proportion of entries stored in the lower level cache of the memory hierarchy having been prefetched and written back from the higher level cache of the memory hierarchy unused, that are subsequently explicitly requested by the processing circuitry is at least a predetermined proportion.

5. The apparatus according to claim 4, wherein
the predetermined proportion is 0.25.

6. The apparatus according to claim 4, wherein
the predetermined proportion is calculated over a predetermined number of previous writebacks performed by the writeback circuitry.

7. The apparatus according to claim 6, wherein
the predetermined number is 64.

8. The apparatus according to claim 2, wherein
the one or more conditions comprise a second condition that the data is stored at a memory address in a subset of the memory that is associated with the prefetch circuitry.

9. The apparatus according to claim 1, wherein
the prefetch circuitry comprises a plurality of prefetchers, each of which performs prefetching based on different criteria; and
the tracking circuitry is configured to track, for each prefetcher in the prefetchers, the proportion of the entries that are prefetched by that prefetcher and stored in the lower level cache of the memory hierarchy having been written back from the higher level cache of the memory hierarchy, that are subsequently explicitly requested by the processing circuitry in response to one of the instructions.

10. The apparatus according to claim 9, wherein
each of the prefetchers is associated with a different subset of the memory; and
the proportion is tracked for each prefetcher based on those of the entries that are prefetched by that prefetcher whose memory address lies within the subset of the memory associated with that prefetcher.

11. The apparatus according to claim 10, wherein
the writeback circuitry is configured to inhibit writing back the data when the data was prefetched by a first prefetcher and has a memory address within the subset of the memory associated with a different prefetcher.

12. The apparatus according to claim 1, wherein
the prefetch circuitry is configured to acquire the data from the memory hierarchy; and
the prefetch circuitry is configured to cause the data to be stored in the higher level cache.

13. The apparatus according to claim 1, wherein
the higher level cache is a second-last-level cache.

14. The apparatus according to claim 1, wherein
the lower level cache is a last-level cache.

15. A method comprising:
prefetching data from a memory hierarchy, comprising a memory and a plurality of caches, before the data is explicitly requested by processing circuitry configured to execute a stream of instructions;
causing the data to be written back from a higher level cache of the memory hierarchy to a lower level cache of the memory hierarchy; and
tracking a proportion of entries that are stored in the lower level cache of the memory hierarchy having been written back from the higher level cache of the memory hierarchy, that are subsequently explicitly requested by the processing circuitry in response to one of the instructions.

16. An apparatus comprising:
means for prefetching data from a memory hierarchy, comprising a memory and a plurality of caches, before the data is explicitly requested by processing circuitry configured to execute a stream of instructions;
means for causing the data to be written back from a higher level cache of the memory hierarchy to a lower level cache of the memory hierarchy; and
means for tracking a proportion of entries that are stored in the lower level cache of the memory hierarchy having been written back from the higher level cache of the memory hierarchy, that are subsequently explicitly requested by the processing circuitry in response to one of the instructions.

* * * * *